(12) United States Patent
Matsumura

(10) Patent No.: US 10,560,635 B2
(45) Date of Patent: Feb. 11, 2020

(54) CONTROL DEVICE, CONTROL METHOD, AND PROGRAM

(71) Applicant: Sony Corporation, Tokyo (JP)

(72) Inventor: Nao Matsumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/061,056

(22) PCT Filed: Nov. 10, 2016

(86) PCT No.: PCT/JP2016/083437
§ 371 (c)(1),
(2) Date: Jun. 11, 2018

(87) PCT Pub. No.: WO2017/130521
PCT Pub. Date: Aug. 3, 2017

(65) Prior Publication Data
US 2018/0367741 A1 Dec. 20, 2018

(30) Foreign Application Priority Data

Jan. 26, 2016 (JP) .................................. 2016-012193

(51) Int. Cl.
*H04N 5/232* (2006.01)
*G03B 13/36* (2006.01)
*G03B 13/16* (2006.01)
*G03B 17/20* (2006.01)
*H04N 5/235* (2006.01)
*H04N 9/73* (2006.01)

(52) U.S. Cl.
CPC ....... *H04N 5/232945* (2018.08); *G03B 13/16* (2013.01); *G03B 13/36* (2013.01); *H04N 5/232127* (2018.08); *G03B 17/20* (2013.01); *H04N 5/2353* (2013.01); *H04N 9/735* (2013.01)

(58) Field of Classification Search
CPC .............................................. H04N 5/232945
USPC ...................................................... 348/333.03
See application file for complete search history.

(56) References Cited

U.S. PATENT DOCUMENTS

2015/0334290 A1* 11/2015 Akaho ............... H04N 5/23212
348/333.12

FOREIGN PATENT DOCUMENTS

| JP | 2003-259163 A | 9/2003 |
|---|---|---|
| JP | 2006-135873 A | 5/2006 |
| JP | 4408779 B2 | 11/2009 |
| JP | 2010-087956 A | 4/2010 |
| JP | 2012-044604 A | 3/2012 |
| JP | 2013-011811 A | 1/2013 |
| JP | 2014-013398 A | 1/2014 |

(Continued)

*Primary Examiner* — Joel W Fosselman
(74) *Attorney, Agent, or Firm* — Michael Best & Friedrich LLP

(57) ABSTRACT

[Object] To implement image capturing in a form close to the user's intention through a simpler manipulation.
[Solution] A control device including: a setting unit configured to set a region corresponding to at least a part of an image captured by an imaging unit in accordance with display information for assisting with photography, the display information being displayed together with the image; and a control unit configured to control an operation related to imaging by the imaging unit on a basis of the at least one region.

17 Claims, 12 Drawing Sheets

(56) References Cited

FOREIGN PATENT DOCUMENTS

WO 2013/161424 A1 10/2013

\* cited by examiner

CONTROL DEVICE, CONTROL METHOD, AND PROGRAM

TECHNICAL FIELD

The present disclosure relates to a control device, a control method, and a program.

BACKGROUND ART

In recent years, among functions of imaging devices capable of capturing images such as still images or moving images such as digital still cameras and digital video cameras (hereinafter also referred to collectively as "digital cameras"), various functions of assisting a user with photography have been proposed. As such a function, functions of automatically controlling an operation related to image capturing such as adjustment of focus, white balance, and exposure such as auto focus (AF), auto white balance (AWB), and auto exposure (AE) have also been proposed. For example, an example of a technique of automatically controlling exposure, light emission of a strobe, or the like in order to acquire an appropriate exposure image is disclosed in Patent Literature 1.

CITATION LIST

Patent Literature

Patent Literature 1: JP 4408779B

DISCLOSURE OF INVENTION

Technical Problem

As described above, since the imaging device automatically controls an operation related to image capturing such as adjustment of focus, white balance, and exposure (hereinafter also referred to simply as "automatic control"), the user is able to take an image in a more suitable form without performing a complicated manipulation.

Meanwhile, there are cases in which a subject specified for the imaging device to perform automatic control (that is, a subject recognized as more preferable) does not coincide with a subject to be photographed by the user. Under such circumstances, for example, automatic control by the imaging device is performed so that a subject different from the subject to be photographed by the user is imaged in a more suitable form, and content of the automatic control may be different from control intended by the user. In this case, a situation in which, in order to take an image intended by the user, the user performs a complicated manipulation of manually adjusting (changing), for example, focus, white balance, exposure, or the like, and then takes an image of a desired subject can also be assumed.

In this regard, the present disclosure proposes a control device, a control method, and a program which are capable of implementing image capturing in a form close to the user's intention through a simpler manipulation.

Solution to Problem

According to the present disclosure, there is provided a control device including: a setting unit configured to set a region corresponding to at least a part of an image captured by an imaging unit in accordance with display information for assisting with photography, the display information being displayed together with the image; and a control unit configured to control an operation related to imaging by the imaging unit on a basis of the at least one region.

In addition, according to the present disclosure, there is provided a control method including, by a processor: setting a region corresponding to at least a part of an image captured by an imaging unit in accordance with display information for assisting with photography, the display information being displayed together with the image; and controlling an operation related to imaging by the imaging unit on a basis of the at least one region.

In according to the present disclosure, there is provided a program causing a computer to execute: setting a region corresponding to at least a part of an image captured by an imaging unit in accordance with display information for assisting with photography, the display information being displayed together with the image; and controlling an operation related to imaging by the imaging unit on a basis of the at least one region.

Advantageous Effects of Invention

As described above, according to the present disclosure, a control device, a control method, and a program which are capable of implementing image capturing in a form close to the user's intention through a simpler manipulation are provided.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
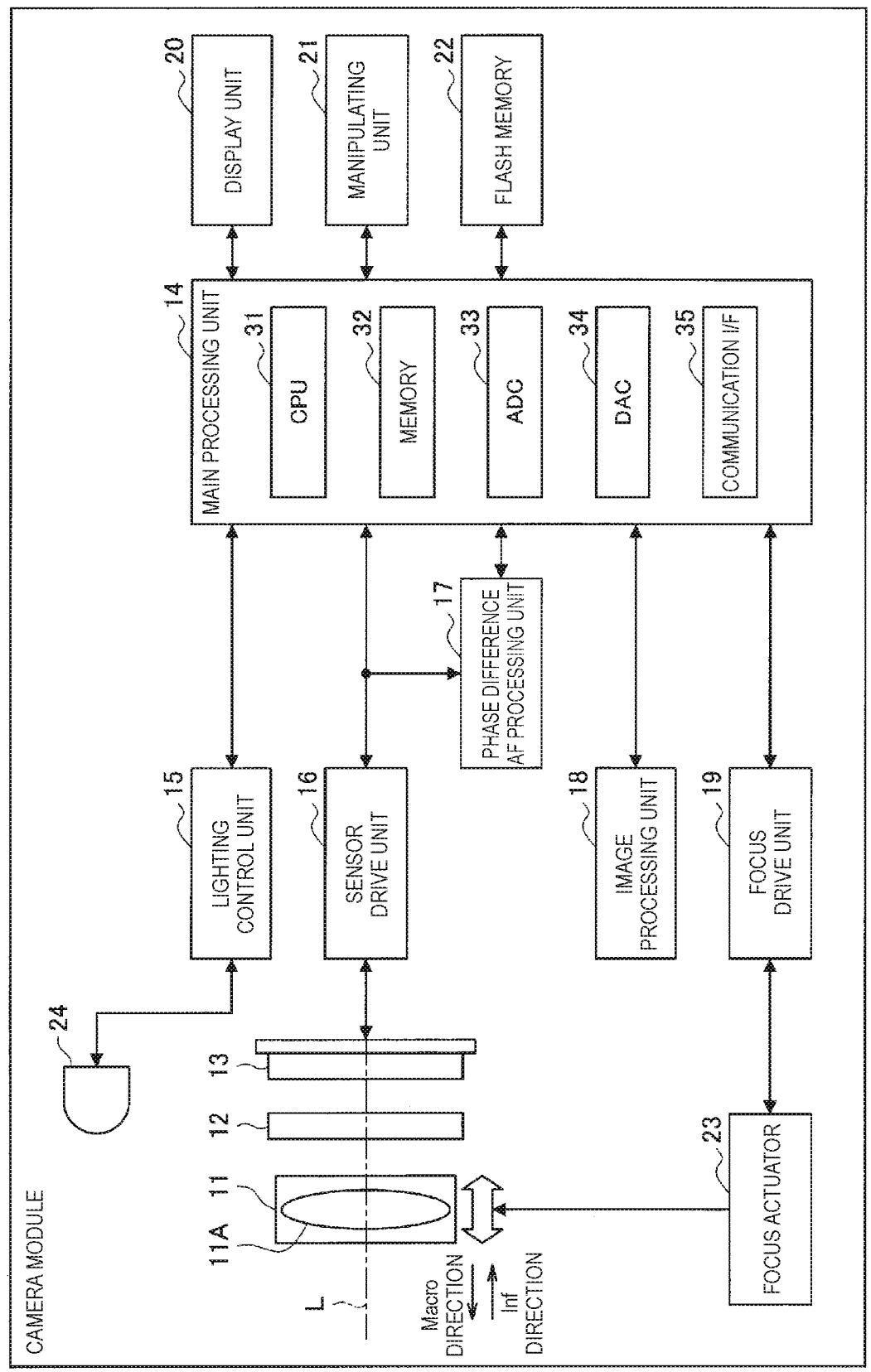
FIG. 1 is a block diagram illustrating an example of a configuration of a camera module according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
1. Embodiment
1.1. Configuration example of camera module
1.2. Technical features
1.3. Process
1.4. Operation and effect
2. Modified examples
2.1. First modified example: example of target region setting according to display information
2.2. Second modified example: example of application to bracket photography
2.3. Third modified example: example of causing region used for control to be changed chronologically
2.4. Fourth modified example: example of control using setting result of target region
2.5. Fifth modified example: UI presentation example
3. Examples
3.1. First example: example of implementation of automatic control function based on setting of target region
3.2. Second example: application example
4. Conclusion

1. EMBODIMENT 1.1. Configuration Example of Camera Module

First, an example of a configuration of a camera module according to one embodiment of the present disclosure will be described with reference to FIG. 1. FIG. 1 is a block diagram illustrating an example of a configuration of a camera module according to the present embodiment. Further, in the following description, unless otherwise specified, in a case in which "imaging" or "image capturing" is described, it indicates an operation of capturing an image through an imaging unit (or an imaging device) such as a camera module. Further, in a case in which "photography" or "taking an image" is described, it indicates a behavior of the user of taking an image using an imaging device such as a camera module.

As illustrated in FIG. 1, a camera module according to the present embodiment includes a lens barrel 11, an optical filter 12, an image sensor 13, a main processing unit 14, a lighting control unit 15, a sensor drive unit 16, a phase difference AF processing unit 17, an image processing unit 18, a focus drive unit 19, a display unit 20, a manipulating unit 21, a flash memory 22, a focus actuator 23, and a lighting unit 24.

Further, in FIG. 1, the camera module is configured integrally with the lens barrel 11. Here, the camera module may be configured so that the lens barrel 11 is detachable.

The lens barrel 1 includes an imaging optical system 11A such as a lens group and a diaphragm, and causes light incident thereon to converge onto the image sensor 13 via the optical filter 12.

Further, a lens position (that is, a focal position) of the lens group of the imaging optical system 11A is movable in an optical axis L direction so that the focus can be adjusted.

The optical filter 12 is an optical element for reducing false color and moire occurring in a captured image captured by the image sensor 13. In other words, the optical filter 12 is an optical low-pass filter, and attenuates a partial component of the light from the imaging optical system 11A and outputs the attenuated component to the image sensor 13.

The image sensor 13 is an imaging element that receives light (subject light) incident from the imaging optical system 11A via the optical filter 12 and captures a captured image. As the image sensor 13, for example, a complementary metal oxide semiconductor (CMOS) image sensor or the like can be employed.

Further, a light receiving surface of the image sensor 13 may include, for example, a detection pixel for detecting a phase difference used for phase difference AF and a common pixel which is not used for detecting a phase difference (a pixel intended for obtaining an image serving as a captured image) other than the detection pixel. Further, as a configuration for detecting the phase difference used for the phase difference AF, another sensor different from the detection pixel may be separately installed outside the light receiving surface of the image sensor 13.

The image sensor 13 supplies captured image (image signal) obtained by the imaging to the sensor drive unit 16.

The display unit 20 includes, for example, a liquid crystal display (LCD) panel and displays information related to an imaging mode of the camera module, a preview image before imaging, an image for confirmation after imaging, an image in a focused state at the time of AF, and the like.

The manipulating unit 21 is a switch group manipulated by the user and includes a power switch, a release (imaging trigger) switch, a zoom manipulation switch, an imaging mode selection switch, and the like.

The flash memory 22 is detachable to the camera module. The captured image supplied from the main processing unit 14 is recorded (stored) in the flash memory 22.

The focus actuator 23 is driven by the focus drive unit 19 and causes the lens position of the imaging optical system 11A to move in the optical axis L direction.

Under the control of the lighting control unit 15, the lighting unit 24 emits light for illuminating the subject or light serving as a torch auxiliary light for AF.

For example, a flash lighting device using a xenon tube, a light emitting diode (LED) lighting device including an LED capable of performing continuous light emission, or the like can be employed as the lighting unit 24. In a case in which the camera module is mounted in a mobile device such as a smartphone or the like, a comparatively small LED lighting device can be employed as the lighting unit 24.

The lighting unit 24 projects light onto a subject field through a light projecting lens (not illustrated) having a groove with a predetermined pattern formed therein, and improves the AF accuracy for dark subjects or low contrast subjects.

The main processing unit 14 controls the respective blocks constituting the camera module.

The main processing unit 14 includes, for example, a central processing unit (CPU) 31, a memory 32, an analog to digital converter (ADC) 33, a digital to analog converter (DAC) 34, and a communication I/F 35.

The CPU 31 implements various kinds of functions of the camera module by executing a program stored in the memory 32. As a specific example, the CPU 31 controls the lighting control unit 15, the flash memory 22, or the like such that various kinds of processes such as AF, AWB, AE, and the like, capturing of captured images, various kinds of image processing, and recording of captured images are executed.

Further, the CPU 31 may present the user with information for assisting the user with photography of images via an output I/F such as the display unit 20 or the like. As a specific example, the CPU 31 may cause information usable as an index for deciding a composition of an image taken by the user such as a so-called grid line to be superimposed and displayed on a captured image such as a preview image. Further, as another example, the CPU 31 may cause display information for presenting a state, a setting, or the like related to the image capturing by the camera module such as so-called histogram or various kinds of icons to be superimposed and displayed on a captured image.

Further, the CPU 31 controls an operation related to the image capturing such as AF, AWB, AE, or the like in accordance with the display information (for example, the grid line, the histogram, the icon, or the like) displayed together with the captured image (for example, the preview image). Specifically, the CPU 31 sets at least one region (hereinafter also referred to as a "target region") in which a subject to be photographed by the user is estimated to be present in the captured image in accordance with a display position, a display range (size), or the like of the display information displayed together with the captured image. Then, the CPU 31 controls the operation related to the image capturing by using at least some target regions among the set at least one target region. This operation will be separately described later in detail. Further, a portion of setting the target region in the CPU 31 corresponds to an example of a "setting unit," and a portion of controlling the operation related to the image capturing using the set target region corresponds to an example of a "control unit."

The memory 32 is constituted by a volatile memory such as a random access memory (RAM), a non-volatile memory such as an electrically erasable programmable read only memory (EEPROM), or the like, and stores a program executed by the CPU 31 and data necessary for the operation of the CPU 31.

The ADC 33 performs AD conversion of converting an analog signal into a digital signal. The DAC 34 converts a digital signal into an analog signal. The communication I/F 35 controls communication with the Internet or the like.

The lighting control unit 15 controls the lighting unit 24 such that light for illuminating the subject or light serving as a torch auxiliary light for AF is emitted.

In other words, the lighting control unit 15 causes the lighting unit 24 to emit (turn on) an electronic flash serving as light for illuminating the subject in synchronization with an imaging operation of the image sensor 13. Further, the lighting control unit 15 causes the lighting unit 24 to emit the torch auxiliary light in synchronization with the AF operation.

The sensor drive unit 16 controls the image sensor 13 such that the captured image is captured. Further, the sensor drive unit 16 performs AD conversion on the image signal of the captured image captured by the image sensor 13 if necessary, and supplies the resulting signal to the main processing unit 14 and the phase difference AF processing unit 17.

The phase difference AF processing unit 17 calculates a lens movement amount for causing the lens position of the imaging optical system 11A (the lens group) to move in accordance with the phase difference AF using the pixel value of the detected pixel in the image signal of the captured image from the sensor drive unit 16, and supplies the lens movement amount to the main processing unit 14.

The image processing unit 18 performs image processing such as γ conversion, color interpolation, and compression and decompression according to a predetermined compression/decompression scheme such as Joint Photographic Experts Group (JPEG) on the captured images which are captured by the image sensor 13 and supplied via the sensor drive unit 16 and the main processing unit 14. Further, the image processing unit 18 calculates a contrast evaluation value indicating the contrast of the captured image and supplies the contrast evaluation value to the main processing unit 14. The main processing unit 14 performs (control of) the contrast AF using the contrast evaluation value from the image processing unit 18.

The focus drive unit 19 adjusts the focus by driving the focus actuator 23 under the control of the main processing unit 14 and causing the lens position of the imaging optical system 11A to move in the optical axis L direction.

Further, the phase difference AF processing unit 17 can be (internally) installed in the image sensor 13.

Further, the phase difference AF processing unit 17 can be implemented by hardware or software. In a case in which the phase difference AF processing unit 17 is implemented by software, for example, a program constituting the software is installed in a computer such as the main processing unit 14 and executed by the CPU 31 of the main processing unit 14.

In this case, the process performed by the CPU 31 in accordance with the program need not necessarily be performed sequentially as a series of operations. In other words, the process performed by the CPU 31 in accordance with the program also includes processes which are executed in parallel or individually (for example, parallel processes or processes by an object).

Here, the program can be recorded in the memory 32 serving as a recording medium installed in the main processing unit 14 serving as a computer in advance.

Alternatively, the program can be stored (recorded) in, for example, a flash memory 22 which is a removable recording medium and provided as so-called packaged software.

Further, the program can be installed in the main processing unit 14 from the flash memory 22, and the program can be downloaded to the main processing unit 14 via a communication network such as the Internet or a broadcast network such as a terrestrial waves and installed in the internal memory 32.

Further, the configuration described with reference to FIG. 1 is merely an example, and the configuration is not necessarily limited to the example illustrated in FIG. 1. As a specific example, at least some of the components of the camera module may be installed outside the camera module. As a specific example, a component serving as a main control entity such as the main processing unit 14 may be installed in an external device such as a so-called smartphone or the like and control the operations of the respective components in the camera module via communication. Further, among the functions executed by the respective configurations of the camera module, at least some functions may be executed by a component installed outside the camera module.

The example of the configuration of the camera module according to one embodiment of the present disclosure has been described above with reference to FIG. 1. Further, in the camera modules illustrated in FIG. 1, a component of controlling the respective blocks constituting the camera module such as the main processing unit 14 corresponds to an example of a "control device" according to the present embodiment. In this regard, in the following description, in order to facilitate understanding of the features of the present embodiment, a component of capturing the image such as the imaging optical system 11A, the optical filter 12, and the image sensor 13 in the camera modules illustrated in FIG. 1 is referred to as an "imaging unit," and a component for controlling the operation of the imaging unit such as the main processing unit 14 is referred to as a "control device."

1.2. Technical Features

Figure 2:
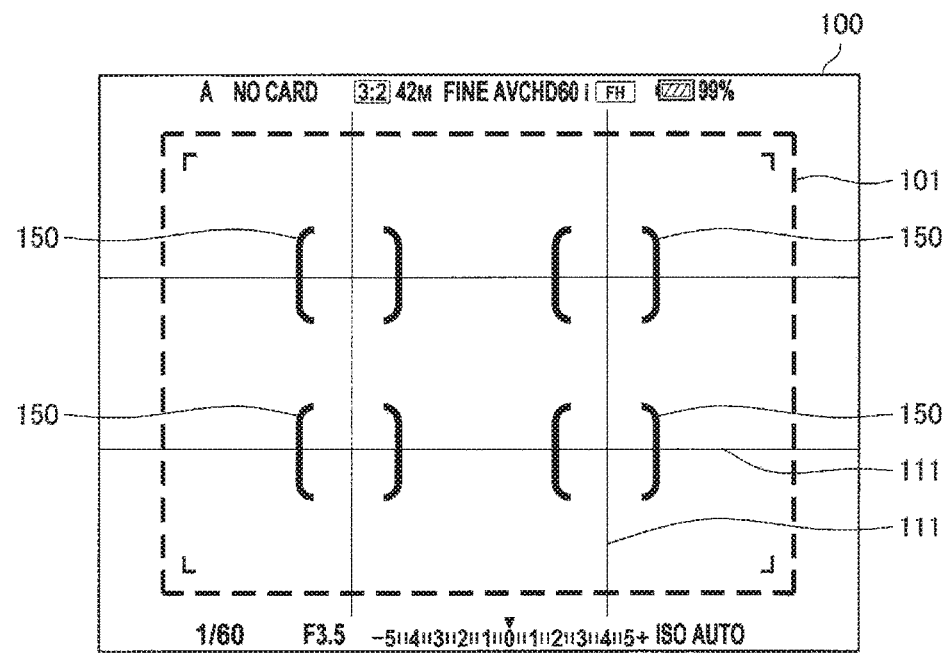
FIG. 2 is an explanatory diagram for describing technical features of a control device according to the embodiment.

Next, the technical features of the control device according to the present embodiment will be described with reference to FIG. 2, particularly, focusing on a portion for estimating the target region in accordance with the display information displayed together with the captured image and controlling an operation related to the image capturing by the imaging unit using the estimated target region. FIG. 2 is an explanatory diagram for describing the technical features of the control device according to the present embodiment, and illustrates an example of a manipulation screen for the user to take an image. Further, in this description, a case in which the control device controls the operation related to the AF (that is, the operation of focusing on the subject) will be described as an example.

In the example illustrated in FIG. 2, reference numeral 100 indicates an example of a display region in which a user interface (UI) is presented by the control device according to the present embodiment. For example, the captured image captured by the imaging unit is displayed in the display region 100 as a preview image.

Further, reference numeral 101 indicates a region in which a position (that is, a focal position) to be focused by AF is set. For example, the control device searches for a more preferable subject from within the region 101, and controls the lens position of the imaging optical system (for example, the imaging optical system 11A illustrated in FIG. 1) on the basis of the operations related to various kinds of AFs such as phase difference AF and contrast AF so that focus is on the searched subject.

Further, information for assisting the user with the photography of the image such as information indicating a setting related to the image capturing by the imaging unit may be displayed in the display region 100 as the display information. At this time, at least some display information among the display information displayed in the display region 100 may be superimposed and displayed on the preview image displayed in the display region 100.

For example, in the example illustrated in FIG. 2, a grid line 111 is presented in a region in which the preview image displayed in the display region 100 is displayed (that is, a region corresponding to the angle of view of the imaging unit) as the display information for assisting the user with decision of the composition. More specifically, in the example illustrated in FIG. 2, the grid line 111 is presented to divide the display region 100 into three in each of a vertical direction and a horizontal direction.

The control device according to the present embodiment sets at least one target region in which the subject to be photographed by the user is estimated to be present in accordance with a form of the display information presented in the region (that is, the region corresponding to the angle of view of the imaging unit) in which the captured image (for example, the preview image) is presented such as the grid line 111.

As a specific example, in a case in which the grid line 111 is presented so that the display region 100 (that is, a region within the angle of view) is divided into three in both the vertical direction and the horizontal direction as in the example illustrated in FIG. 2, the composition of an image to be photographed is estimated to be decided on the basis of a so-called rule of thirds. Therefore, in this case, for example, the control device estimates that there is a subject at a position of an intersection point between the grid line 111 extending in the vertical direction and the grid line 111 extending in the horizontal direction (that is, a position of the subject considered to be preferable in the rule of thirds) and sets a target region 150 so that the intersection point is included. In other words, in the example illustrated in FIG. 2, the control device sets four target regions 150 so that the respective intersection points of the grid lines 111 are included.

Then, the control device according to the present embodiment uses at least some target regions 150 among at least one set target region 150 to control the operation related to the image capturing by the imaging unit such as the AF.

As a specific example, the control device may selectably present at least one set target regions 150 to the user. In this case, the control device may receive a manipulation from the user via a manipulation OF such as a button or a dial, specify the target region 150 selected by the user, and use the specified target region 150 to control the operation related to the image capturing by the imaging unit.

Further, as another example, the control device may execute various kinds of recognition processes such as face recognition for each of the at least one set target region 150 and specify the target region 150 to be used to control the operation related to the image capturing in accordance with a recognition result. With such control, for example, the control device can specify the target region 150 including a person as a subject among at least one set target region 150 and control the operation related to the AF by the imaging unit so that focus is on the person.

Further, as another example, the control device may specify the target region 150 to be used to control the operation related to the image capturing in accordance with a state of the imaging unit such as a direction of the imaging unit (either of a vertical orientation and a horizontal orientation or the like), an angle of the imaging unit (whether or not it is horizontal), or whether the imaging unit is on a tripod. As a more specific example, in a case in which the imaging unit is on the tripod, and the imaging unit is horizontally supported, there is a high possibility that the user is taking a landscape. Therefore, in this case, the imaging device may use the target region 150 indicating the subject to control the operation related to the image capturing by the imaging unit so that a priority is given to a subject positioned at an infinity distance.

Of course, the above-described example is merely an example, and the method is not particularly limited as long as the control device can specify at least some target regions 150 among at least one set target region 150 on the basis of a predetermined condition.

Further, content of the operation is not particularly limited as long as the control device can control the operation related to the image capturing by the imaging unit on the basis of the set target region 150. As a specific example, the control device may control the exposure (that is, may control the operation related to the AE) in accordance with brightness of the image in at least some target regions 150 (that is, a pixel value of a pixel corresponding to the target region 150). Further, as another example, the control device may control the white balance in accordance with a color temperature of an image in at least some target regions 150 (that is, may control the operation related to the AWB.)

Further, the control device may use the set target region 150 to control a plurality of operations (for example, the AF, the AE, the AWB, and the like). In this case, the control device may individually specify the target region 150 to be used for the control in the control of each of a plurality of operations. At this time, the control device may use different target regions 150 in the control of each of a plurality of operations (for example, the AF, the AE, the AWB, and the like). As a specific example, in a case in which a plurality of target regions 150 are set, the control device may use the target region 150 indicating the subject on the front side in the depth direction to control the AF and may use the target region 150 indicating the subject on the back side to control the AE.

Further, in the above description, the case in which the technical features of the control device according to the present embodiment are applied to the imaging device which captures an image while the user checks the subject through the preview image captured by the imaging unit has been described as an example. On the other hand, its application destination is not particularly limited as long as the technical features of the control device according to the present embodiment can be applied. As a specific example, the technical features of a control device according to the present embodiment may be applied to the imaging device that captures the image while the user checks an optical image of the subject through a view finder as in the imaging device such as a so-called single lens reflex camera or a range finder camera.

In this case, for example, the display information may be superimposed on the optical image of the subject by installing a so-called transmissive display in the view finder and causing the display information such as the grid line to be displayed on the transmissive display. With this configuration, it is possible to estimate the subject to be photographed by the user from the optical image of the subject visually recognized by the user through the view finder (that is, the optical image corresponding to the angle of view of the imaging device) in accordance with the display form of the display information for assisting with the photography of the user such as the grid line. Using such characteristics, preferably, the control unit of the imaging device sets at least one target region 150 in accordance with the display information such as the grid line superimposed on the optical image of the subject and use at least some target regions 150 for image capturing.

The technical features of the control device according to the present embodiment have been described above with reference to FIG. 2, particularly, focusing on a portion for estimating the target region in accordance with the display information displayed together with the captured image and controlling an operation related to the image capturing by the imaging unit using the estimated target region.

1.3. Process

Figure 3:
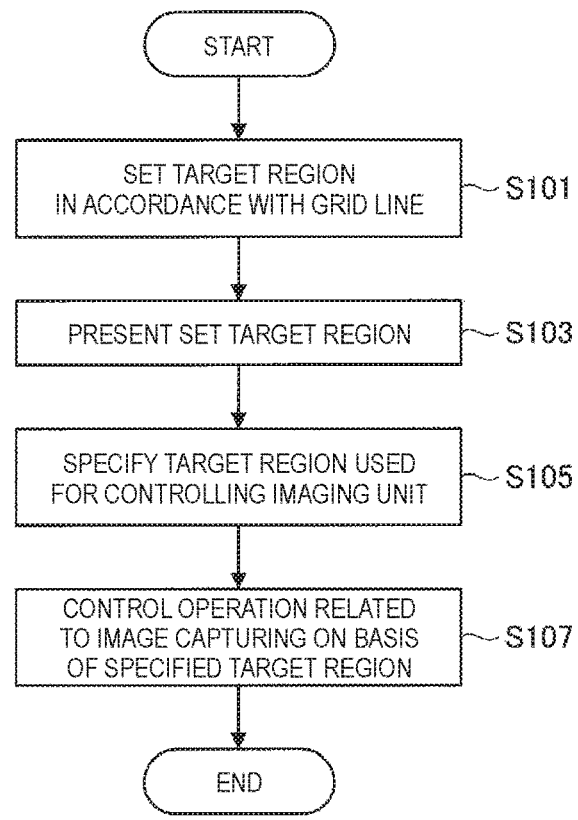
FIG. 3 is a flowchart for describing an example of a flow of a series of processes of a control device according to the embodiment.

Next, an example of a flow of a series of processes of the control device according to the present embodiment will be described with reference to FIG. 3, particularly, focusing on a portion of estimating the target region in accordance with the display information displayed together with the captured image and controlling an operation related to the image capturing by the imaging unit using the estimated target region. FIG. 3 is a flowchart illustrating an example of a flow of a series of processes of the control device according to the present embodiment. Further, in this description, a case in which the control device controls the operation related to the AF (that is, the operation of focusing on the subject) will be described as an example.

For example, in a case in which a trigger for the operation related to the AF is detected, for example, in a case in which the user pushes a shutter button halfway, the control device selects the target region 150 in accordance with the form of the grid line being presented to the user (S101).

Then, the control device presents the target region 150 to the user by causing at least one set target region 150 to be superimposed and displayed on the preview image presented on the UT (S103). Further, the control device receives a manipulation from the user via a manipulation I/F such as a button or a dial and specifies the target region 150 selected by the user among at least one target region 150 presented to the user (S105).

Then, the control device controls the operation related to the AF by the imaging unit on the basis of the specified target region 150. More specifically, in order to focus on the subject in the specified target region 150, the control device controls the lens position of the imaging optical system (for example, the imaging optical system 11A illustrated in FIG. 1) on the basis of the operation related to various kinds of AFs such as the phase difference AF or the contrast AF (S107). With such control, the captured image in which focus is on the subject in the specified target region 150 is captured by the imaging unit.

The example of the flow of a series of processes of the control device according to the present embodiment has been described above with reference to FIG. 3, particularly, focusing on a portion of estimating the target region in accordance with the display information displayed together with the captured image and controlling an operation related to the image capturing by the imaging unit using the estimated target region.

1.4. Operation and Effect

As described above, the control device according to the present embodiment sets at least one target region in accordance with the display information displayed together with the captured image such as the grid line. Then, the control device uses at least some target regions among at least one set target region to control the operation related to the image capturing by the imaging unit. With such control, the control device according to the present embodiment can control the operation related to the image capturing by the imaging unit so that the subject closer to the user's intention is preferentially imaged among the subjects to be imaged by the imaging unit.

Further, the control device according to the present embodiment can exclude regions other than the set target region from the region target used to control the operation related to the image capturing by the imaging unit. Therefore, for example, it is possible to further reduce a probability of the occurrence of a situation in which a subject unintended by the user is preferentially imaged.

As a specific example, the control device controls the operation related to the AF by the imaging unit such that it is possible to reduce a probability that focus is on the subject unintended by the user even in a situation in which there are subjects at different positions along the depth direction.

Further, as another example, the control device controls the operation related to the AE by the imaging unit such that it is possible to reduce the probability that the subject intended by the user is imaged darker (or the probability that the subject unintended by the user is imaged brighter) even in a situation in which there are a plurality of subjects with different brightnesses within the angle of view of the imaging unit.

Further, as another example, the control device controls the operation related to the AWB by the imaging unit such that it is possible to image the subject with a color tone closer to the intention of the user even in a situation in which there are a plurality of regions illuminated by light sources having different color temperatures in the angle of view of the imaging unit.

Further, the control device according to the present embodiment may use a target region setting result for various kinds of recognition processes such as so-called face recognition or the like. Accordingly, for example, since the control device can exclude regions other than the set target region from a target of various kinds of recognition processes, it is possible to reduce a calculation amount of the recognition process and further improve a response related to the presentation of the recognition result.

2. MODIFIED EXAMPLES

Next, modified examples of the present embodiment will be described.

2.1. First Modified Example: Example of Target Region Setting According to Display Information First, as a first modified example, an example of the display information displayed together with the captured image such as the grid line, and the target region setting example according to the display information will be described.

(Setting Example Based on Grid Line)

First, the target region setting example in a case in which the control device displays the grid line as the display information superimposed and displayed on the captured image will be described with reference to FIGS. 4 to 8. FIGS. 4 to 8 are explanatory diagrams for describing an overview of the control device according to the first modified example and illustrate an example of the grid line superimposed and displayed on the captured image.

Figure 4:
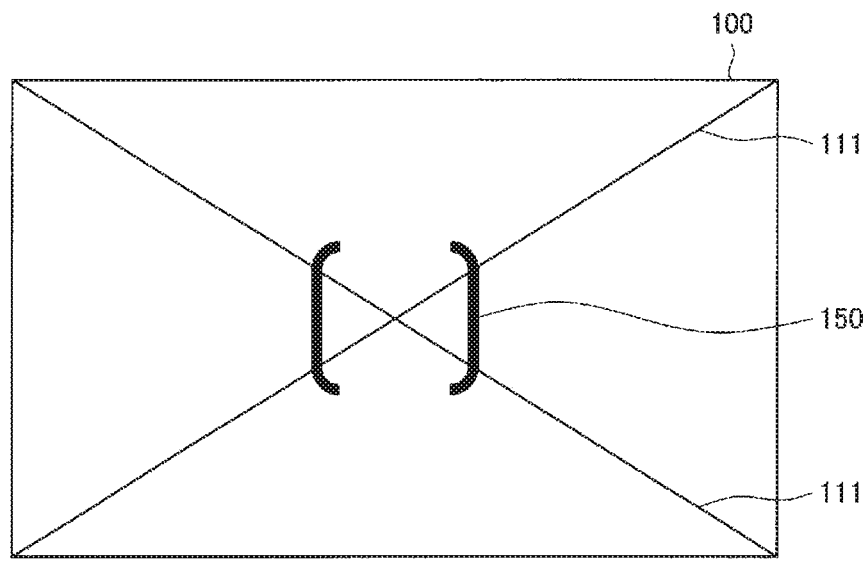
FIG. 4 is an explanatory diagram for describing an overview of a control device according to a first modified example.

For example, FIG. 4 illustrates an example in which the grid line 111 is presented along a diagonal line of the display region 100 (that is, the angle of view) in which the captured image is displayed. In the example illustrated in FIG. 4, for example, the control device according to the first modified example may estimate that there is a subject to be photographed by the user at a position of the intersection point of the grid lines 111 (that is, the center of the display region 100) and set the target region 150 so that the intersection point is included.

Figure 5:
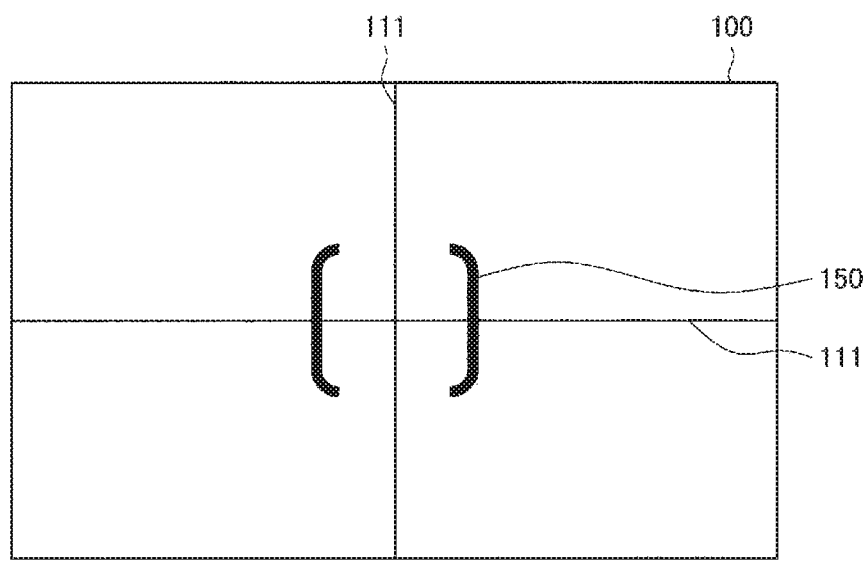
FIG. 5 is an explanatory diagram for describing an overview of a control device according to a first modified example.

Further, FIG. 5 illustrates an example in which the grid line 111 is presented so that the display region 100 in which the captured image is displayed is divided into two in each of the vertical direction and in the horizontal direction. In the example illustrated in FIG. 5, for example, the control device according to the first modified example may estimate that there is a subject to be photographed by the user at the position of the intersection point between the grid lines 111 (that is, the center of the display region 100) and set the target region 150 so that the intersection point is included.

Figure 6:
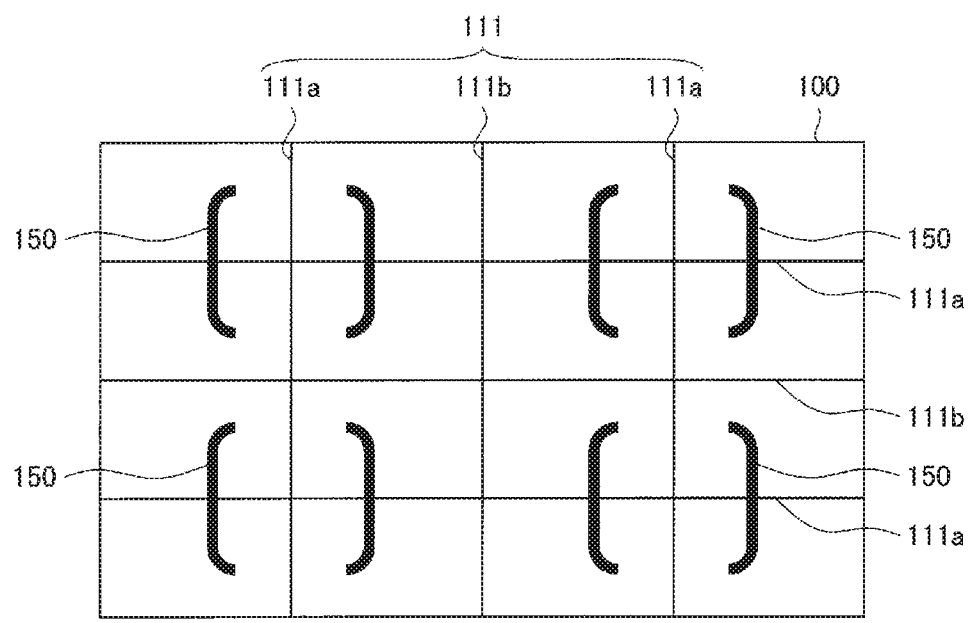
FIG. 6 is an explanatory diagram for describing an overview of a control device according to a first modified example.

Further, FIG. 6 illustrates an example in which the grid line 111 is presented so that the display region 100 in which the captured image is displayed is divided into four in each of the vertical direction and the horizontal direction. In the example illustrated in FIG. 6, similarly to the example described with reference to FIGS. 2, 4, and 5, the control device according to the first modified example may estimate that there is a subject to be photographed by the user at the position of the intersection point between the grid lines 111 and set the target region 150 so that the intersection point is included.

Further, the control device may set the target region 150 so that the position of the intersection point is included only for some intersection points among the intersection points of the grid lines 111. For example, in the example illustrated in FIG. 6, the control device sets the target region 150 so that the intersection point is included for only an intersection point of a grid line 111a extending in the vertical direction and a grid line 111a extending in the horizontal direction among the grid lines indicated by reference numerals 111a and 111b on the basis of a so-called rule for fourths.

Figure 7:
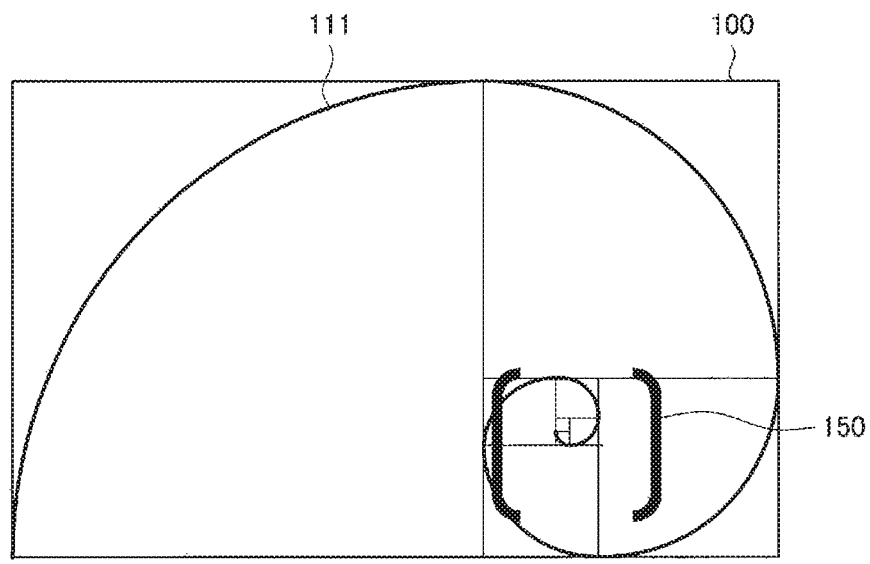
FIG. 7 is an explanatory diagram for describing an overview of a control device according to a first modified example.

Further, FIG. 7 illustrates an example in which the grid line 111 is presented on the basis of a so-called Fibonacci spiral (that is, a spiral including a Fibonacci sequence) of dividing the display region 100 in which the captured image is displayed at a golden ratio. In the example illustrated in FIG. 7, for example, the control device according to the first modified example may estimate that there is a subject to be photographed by the user at a position in which the Fibonacci spiral converges and set the target region 150 so that the position is included.

Figure 8:
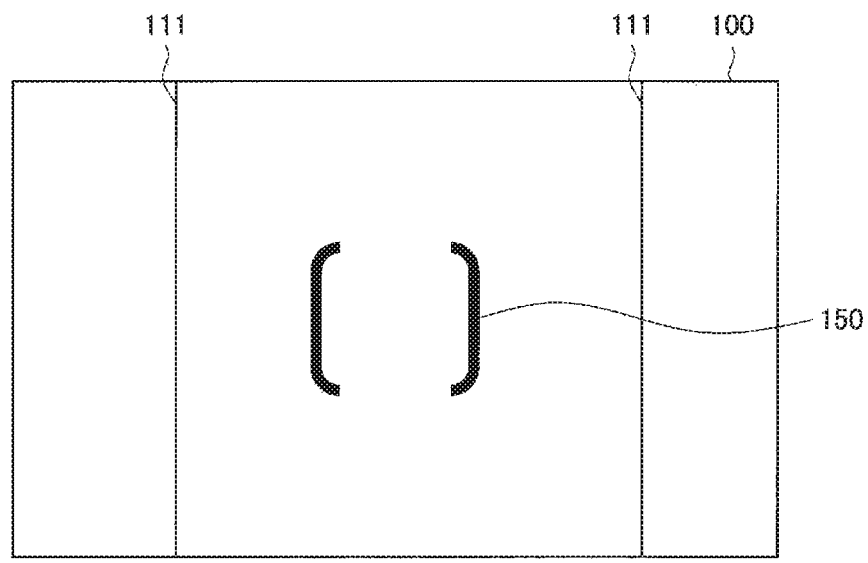
FIG. 8 is an explanatory diagram for describing an overview of a control device according to a first modified example.

Further, FIG. 8 illustrates an example in which a grid line 111 indicating a square region is presented in the display region 100 in which the captured image is displayed under the assumption that a square photograph is cut out by trimming or the like. In the example illustrated in FIG. 8, the control device according to the first modified example may estimate that there is a subject in the square region indicated by the grid line 111 (for example, the center of the square region) and set the target region 150 in the square region.

Further, it will be appreciated that each grid line 111 illustrated in FIG. 2 and FIGS. 4 to 8 may be selectively switched on the basis of an instruction given from the user via the manipulation I/F. Further, at this time, the control device may change the area of the target region 150 to be set in accordance with the selectively presented grid line 111. For example, in the examples illustrated in FIG. 2, FIG. 5, and FIG. 6, the partial regions divided by the grid line 111 have different areas. Therefore, for example, the control device may set the area of the target region 150 in accordance with the area of the partial region divided by the grid line 111.

As described above, for example, it is possible to estimate the composition intended by the user in accordance with the form in which the captured image (that is, the angle of view) into a plurality of partial regions on the basis of the display information for assisting the user with the decision of the composition such as the grid line. Using such characteristics, the control device according to the first modified example estimate the subject to be photographed by the user and controls the operation related to the image capturing by the imaging unit (for example, the AF, the AE, the AWB, or the like) so that the subject is imaged in a more suitable form. Accordingly, the control device according to the first modified example can cause the imaging unit to capture the image in the form closer to the user's intention without performing a complicated manipulation for adjustment of focus, exposure, white balance, or the like.

(Excluded Region Setting Example)

Next, an example in which the control device sets an excluded region excluded from the setting target of the target region in the captured image (that is, the angle of view) in accordance with the display information displayed together with the captured image and sets the target region in accordance with the setting result of the excluded region will be described together with an example of the display information.

Figure 9:
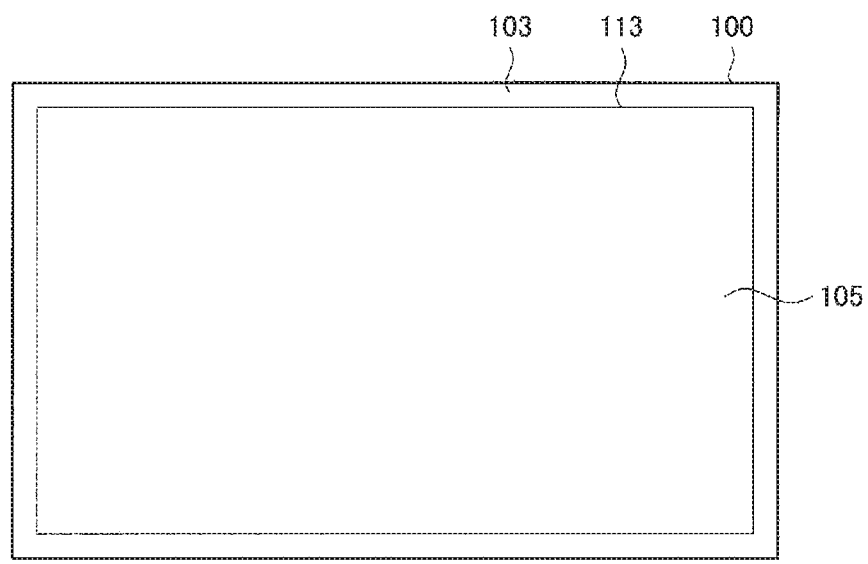
FIG. 9 is an explanatory diagram for describing an overview of a control device according to a first modified example.

For example, FIG. 9 is an explanatory diagram for describing an overview of the control device according to first modified example. Specifically, FIG. 9 illustrates an example in which a safe region for presenting a region serving as a display target identifiably (or for presenting a non-display region identifiably) is superimposed and displayed on the captured image in a case in which the captured image is output to an external display device (for example, an external display or the like).

In FIG. 9, reference numeral 113 indicates an auxiliary line indicating the region serving as the display target such as the safe region. In the example illustrated in FIG. 9, a region 105 corresponding to the inside of the auxiliary line 113 in the display region 100 in which the captured image is displayed corresponds to the safe region (that is, the region serving as the display target), and a region 103 corresponding to the outside of the auxiliary line 113 corresponds to the outside of the safe region (that is, the non-display region).

Due to such characteristics, in the example illustrated in FIG. 9, the control device may set the region 103 corresponding to the outside of the safe region in the display region 100 in which the captured image is displayed as the excluded region.

Specifically, the control device recognizes a position and a range of the safe region in the display region 100 on the basis of a display setting for outputting the captured image to the external display device, and causes the auxiliary line 113 indicating the safe region to be superimposed and displayed on the captured image (for example, the preview image) in accordance with the recognition result. Then, for example, the control device may estimate that there is a subject in another region other than the excluded region in the display region 100 (that is, within the region 105 corresponding to the safe region) and set the target region 150 in the region other than the excluded region.

Figure 10:
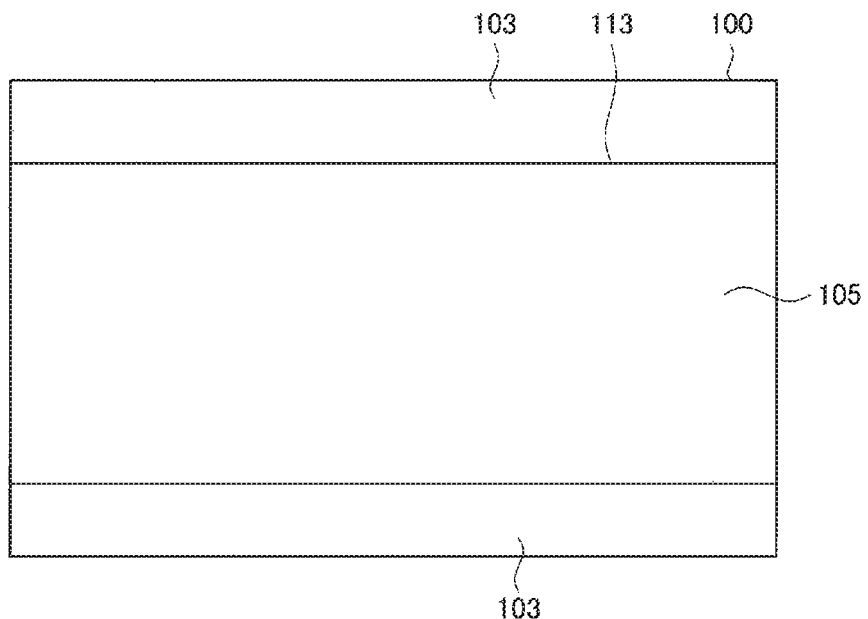
FIG. 10 is an explanatory diagram for describing an overview of a control device according to a first modified example.

Further, FIG. 10 is an explanatory diagram for describing an overview of the control device according to the first modified example. Specifically, FIG. 10 illustrates an example in which a difference in the aspect ratio at the time of imaging is superimposed and displayed on the preview image as the display information under the assumption that the captured image is displayed at an aspect ratio different from that at the time of imaging after the imaging.

In the example illustrated in FIG. 10, a region 103 corresponding to the outside of an auxiliary line 113 in the display region 100 in which the captured image is displayed corresponds to the non-display region due to the difference in the aspect ratio, and a region 105 corresponding to the inside of the auxiliary line 113 corresponds to the region serving as the display target. In other words, in the example illustrated in FIG. 10, the control device may set the region 103 corresponding to the non-display region resulting from the difference in the aspect ratio in the display region 100 in which the captured image is displayed as the excluded region. Further, a subsequent operation is similar as that described above with reference to FIG. 9.

(Setting Example in Which Display Information Indicating State or Setting Related to Image Capturing is Presented)

Figure 11:
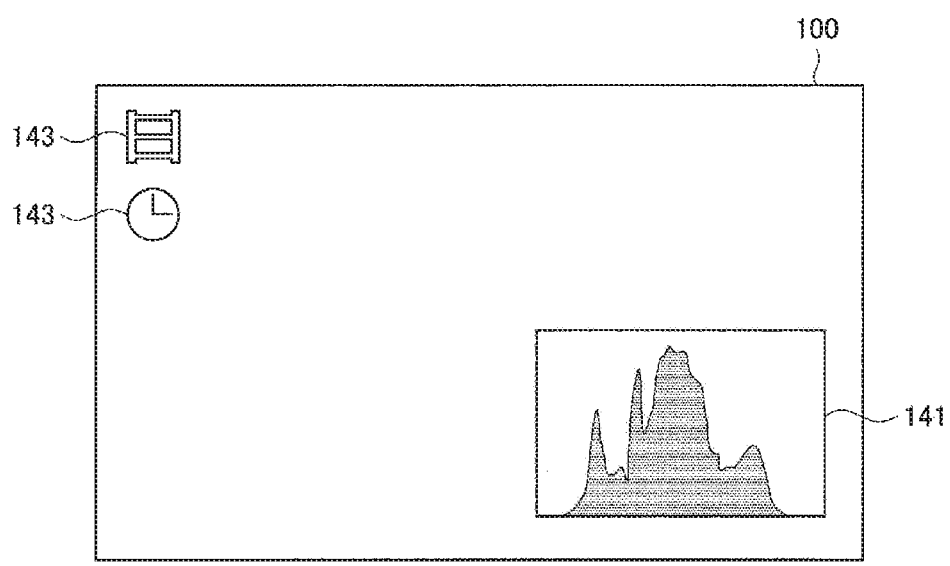
FIG. 11 is an explanatory diagram for describing an overview of a control device according to a first modified example.

Next, an example of setting the target region 150 in a case in which the display information indicating a state, a setting, or the like related to the image capturing is superimposed and displayed on the captured image such as a histogram or various kinds of icons will be described with reference to FIG. 11. FIG. 11 is an explanatory diagram for describing an overview of the control device according to the first modified example, and illustrates an example in which the display information indicating a state, a setting, or the like related to the image capturing is superimposed and displayed on the captured image.

For example, in the example illustrated in FIG. 11, an auxiliary window 141 in which a histogram of the captured image is presented is presented in a part of the display region 100 in which the captured image is displayed. Further, in the example illustrated in FIG. 11, an icon 143 indicating a state, a setting, or the like related to the image capturing is presented in a part of the display region 100. In other words, in the example illustrated in FIG. 11, the display information such as the auxiliary window 141, the icon 143, or the like are superimposed and displayed on the captured image (for example, the preview image).

In this case, for example, a region in which the display information such as the auxiliary window 141 or the icon 143 is superimposed and displayed in the preview image presented in the display region 100 is blocked by the display information and temporarily not viewed. For this reason, under a situation illustrated in FIG. 11, the control device may estimate that there is no subject to be photographed by the user in the region in which the display information such as the auxiliary window 141 or the icon 143 is superimposed and displayed and set the target region 150 in other regions.

Further, the example described above is merely an example, and the method of setting the target region 150 on the basis of a type of display information or the display information is not particularly limited as long as the control device can set the target region 150 in accordance with the display information presented together with the captured image. Further, a plurality of examples among the above-described examples may be combined to set the target region 150. For example, the control device may set the target region 150 so that the intersection point present in the region in which the auxiliary window 141, the icon 143, or the like are not displayed among the intersection points of the grid lines 111 is included.

The example of the display information displayed together with the captured image such as the grid line and the example of setting the target region in accordance with the display information have been described above as the first modified example.

2.2. Second Modified Example: Example of Application to Bracket Photography

Next, an example in which the result of setting the target region 150 is used for so-called bracket photography of capturing a plurality of images while sequentially switching the setting related to the image capturing will be described as a second modified example. For example, FIG. 12 is an explanatory diagram for describing an overview of the control device in accordance with the second modified example.

Figure 12:
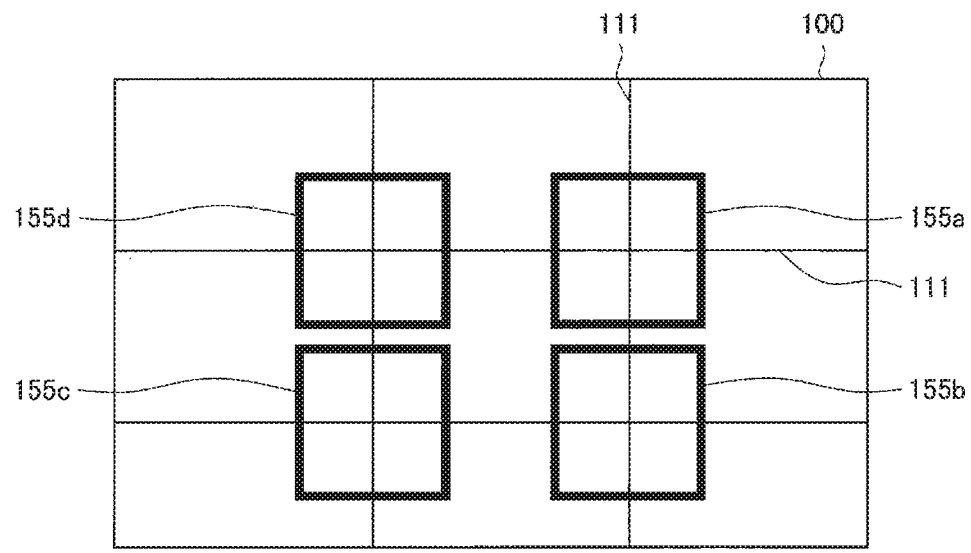
FIG. 12 is an explanatory diagram for describing an overview of a control device according to a second modified example.

In the example illustrated in FIG. 12, the control device presents the grid lines 111 so that the display region 100 in which the captured image is displayed is divided into three in each of the vertical direction and the horizontal direction. In this case, similarly to the example described above with reference to FIG. 2, for example, the control device sets four target regions 150 so that the respective intersection points of the grid lines 111 are included. For example, in FIG. 12, reference numerals 155a to 155d schematically indicate the target regions used for the image capturing by the imaging unit among the set target regions 150. In other words, FIG. 12 illustrates an example in which the control device recognizes that the subject located in each of the target regions 155a to 155d is a subject which is highly likely to photographed by the user.

In this regard, as illustrated in FIG. 12, in a case in which there are a plurality of subjects that are highly likely to be photographed by the user (that is, in a case in which a plurality of target regions 150 are set), the control device in accordance with the second modified example causes the imaging unit to capture an image of each subject while sequentially switching the setting related to the image capturing.

As a more specific example, in the case of the example illustrated in FIG. 12, for example, the control device may cause the imaging unit to capture a plurality of images focused on the subject positioned in each of the target regions 155a to 155d. In this case, for example, the control device controls the operation related to the AF by the imaging unit such that focus is on the subject positioned in a region of interest while sequentially switching the region of interest among the target regions 155a to 155d and causes the imaging unit to capture the image. Accordingly, the user can take a plurality of images in which focus is on the subject positioned in each of the target regions 155a to 155d through a simpler manipulation without performing a complicated manipulation of focusing on the subject positioned in each of the target regions 155a to 155d.

As described above, the control device in accordance with the second modified example captures a plurality of images by sequentially using each of a plurality of set target regions 150 for the operation related to the image capturing by the imaging unit. Further, similarly to the above-described embodiment, the content of the operation related to the image capturing by the imaging unit which is controlled by the control device is not particularly limited. As a specific example, the control device may sequentially use each set target region 150 for the operation related to the AE or the AWB by the imaging unit. Further, the control device may sequentially cause the imaging unit to capture an image corresponding to each of combinations of the subjects and the settings related to the imaging while sequentially switching the target region 150 used for controlling the operation related to the image capturing by the imaging unit and the content of the operation (for example, settings of focus, exposure, white balance, or the like).

The example in which the result of setting the target region 150 is used for so-called bracket photography of capturing a plurality of images while sequentially switching the setting related to the image capturing has been described as the second modified example.

2.3. Third Modified Example: Example of Causing Region Used for Control to be Changed Chronologically In a case in which still images are continuously captured or in a case in which a moving image is captured, when the subject or the imaging unit moves, the position of the subject within the angle of view may change. In this case, for example, it is sometimes desirable to cause the region used for controlling the operation related to the image capturing such as the AF, the AE, the AWB, or the like to be moved in accordance with a change in the position of the subject within the angle of view. In this regard, an example causing the region used for controlling the operation related to the image capturing such as the AF, the AE, the AWB, or the like to be changed chronologically will be described as a third modified example.

In a case in which the imaging unit is caused to capture the subject moving chronologically, for example, the control device estimates a motion of the subject and causes the position of the region to be changed chronologically in accordance with the estimation result so that the region used for controlling the operation related to the image capturing such as the AF, the AE, the AWB, or the like follows the subject. At this time, as a method of estimating the motion of the subject, for example, a method of using the image recognition technique and a method of using a measurement result of a distance between the imaging unit and the subject are generally known. On the other hand, the control device according to the third modified example uses the display information such as the grid line for estimating the motion of the subject.

Figure 13:
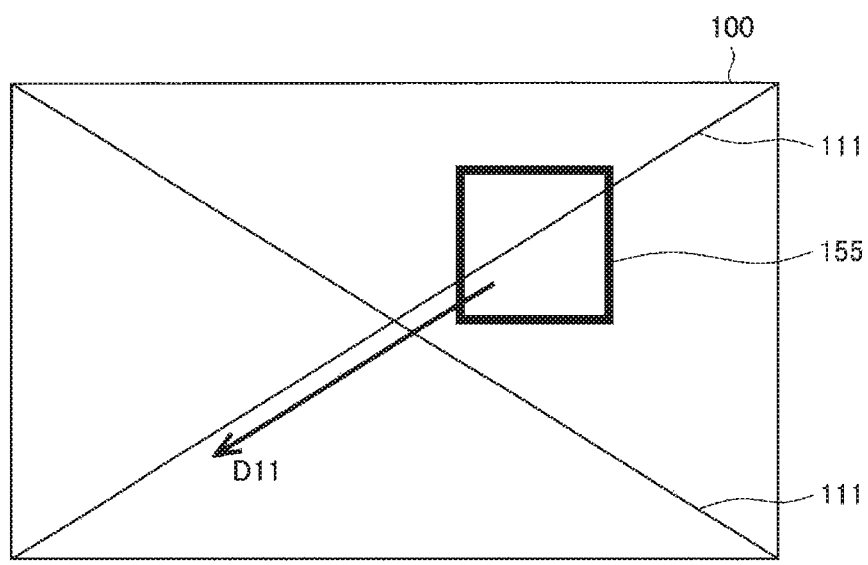
FIG. 13 is an explanatory diagram for describing an overview of a control device according to a third modified example.

For example, FIG. 13 is an explanatory diagram for describing an overview of the control device according to the third modified example, and illustrates an example of capturing an image of the subject which is moving chronologically. In FIG. 13, reference numeral 155 schematically indicates the target region used for capturing the image by the imaging unit among the set target regions 150. In the example illustrated in FIG. 13, for example, grid lines 111 are presented along the diagonal lines of the display region 100 in which a captured image is displayed (that is, the angle of view). In this case, for example, the user is estimated to photograph a subject moving in a direction D11 along the grid line 111 while using the presented grid line 111.

Using such characteristics, for example, the control device according to the third modified example may cause the position of the target region 155 used for controlling the operation related to the image capturing such as the AF, the AE, or the AWB (a "target region of interest 155") to be changed chronologically. In this case, the control device may preferentially execute analysis on the movement in the direction D11 along the grid line 111, for example, when the motion of the subject positioned in the target region of interest 155 is analyzed and cause the position of the target region 155 to be changed chronologically in accordance with the analysis result.

Figure 14:
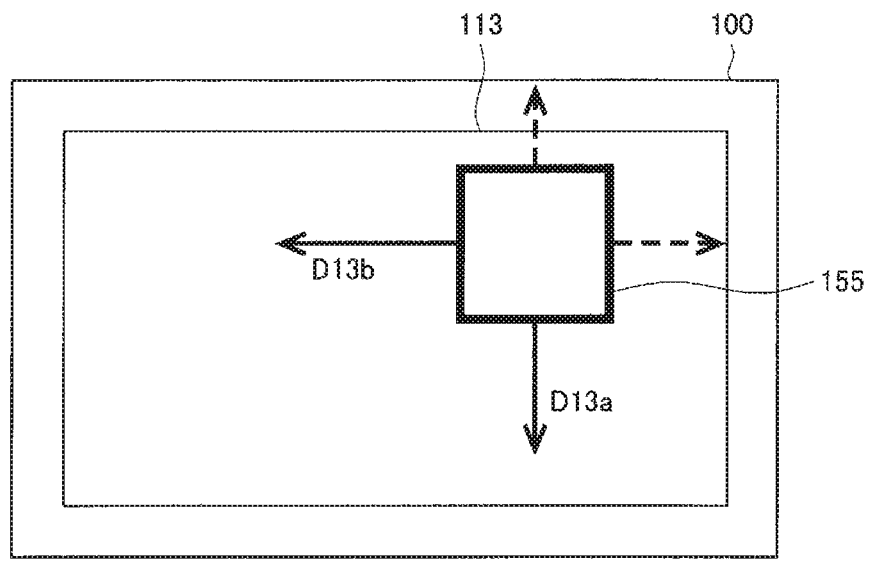
FIG. 14 is an explanatory diagram for describing an overview of a control device according to a third modified example.

Further, FIG. 14 is an explanatory diagram for describing an overview of the control device according to the third modified example, and illustrates another example in which an image of a subject which is moving is captured chronologically. FIG. 14 illustrates an example in which the region serving as the display target such as the safe region is presented identifiably in the display region 100 in which the captured image is displayed, similarly to the example described above with reference to FIG. 9.

For example, as in the example illustrated in FIG. 14, the target region 150 set near the auxiliary line 113 indicating a boundary between the region serving as the display target and the non-display region is selected as the target region 155 used for controlling the operation related to the image capturing. In this case, for example, it is unlikely that the user photographs the outside of the auxiliary line 113 (that is, the non-display region), and it is likely that the user photographs the subject moving in a direction D13a or D13b in which it is away from the auxiliary line 113 (that is, a direction in which it is away from the auxiliary line 113).

Using such characteristics, the control device according to the third modified example may cause the position of the target region 155 used for controlling the operation related to the image capturing to be changed chronologically. In this case, for example, the control device may preferentially execute the analysis on the movement in the direction D13a or D13b in which it is away from the auxiliary line 113 when the motion of the subject positioned in the target region of interest 155 is analyzed and cause the position of the target region 155 to be changed chronologically in accordance with the analysis result. Further, when the motion of the subject positioned in the target region 155 is analyzed, the control device may lower the priority of the analysis for the movement toward the auxiliary line 113 side or may exclude it from the analysis target.

With such control, the control device according to the third modified example uses the display information such as the grid line for estimation of the motion of the subject in a case in which the position of the target region 155 is caused to be changed chronologically to follow the subject which is moving. With this configuration, the control device according to the third modified example can reduce a processing amount related to the estimation of the motion of the subject which is moving and cause the target region 155 to follow the subject more accurately.

The example of causing the region used for controlling the operation related to the image capturing such as the AF, the AE, or the AWB to be chronologically has been described above as the third modified example.

2.4. Fourth Modified Example: Example of Control Using Setting Result of Target Region Next, an example of an operation in a case in which the control device according to the present embodiment selectively switches the operation related to the image capturing by using the setting result of the target region 150 based on the display information such as the grid line will be described as a fourth modified example.

Among the imaging devices, for example, there are imaging devices configured to selectively switch a plurality of types of operations which differ in a detection range of a sensor to be used as the operation of the phase difference AF. As a more specific example, in a case in which image surface phase difference AF using a phase difference sensor installed in an image sensor and separate phase difference AF using a phase difference sensor installed outside an image sensor can be selectively switched and executed, the detection ranges of the respective phase difference sensors may be different from each other. Under the assumption of such a situation, the control device according to the fourth modified example selects a more suitable operation from among a plurality of types of selectively switchable operations on the basis of the setting result of the target region 150.

Figure 15:
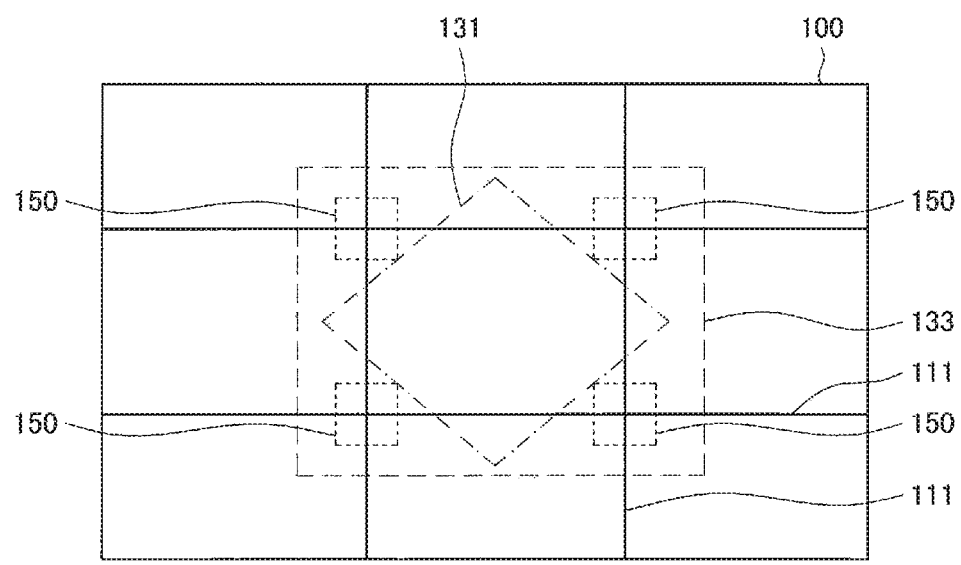
FIG. 15 is an explanatory diagram for describing an overview of a control device according to a fourth modified example.

For example, FIG. 15 is an explanatory diagram for describing an overview of the control device according to the fourth modified example. In FIG. 15, each of reference numerals 131 and 133 schematically indicates a region indicating the detection range of the sensor used for the operation of the phase difference AF. Further, a phase difference sensor having the region 131 as the detection range and a phase difference sensor having the region 133 as the detection range are assumed to be used in different phase difference AF operations. Further, in the example illustrated in FIG. 15, the phase difference sensor having the region 131 as the detection range can detect a phase difference with a higher degree of accuracy than the phase difference sensor having the region 133 as the detection range.

Further, in the example illustrated in FIG. 15, the grid lines 111 are presented so that the display region 100 (that is, the region within the angle of view) in which the captured image is displayed is divided into three in both the vertical direction and the horizontal direction. Therefore, in the example illustrated in FIG. 15, the control device sets four target regions 150 so that the respective intersection points of the grid lines 111 are included.

Here, in the example illustrated in FIG. 15, each of the four set target regions 150 is set to be positioned inside the region 133 and be positioned outside the region 131. In this case, even when the operation of the phase difference AF using the phase difference sensor with the region 131 as the detection range is selected, it is difficult to control the focus such that focus is on the subject positioned in the set target region 150. Therefore, in the example illustrated in FIG. 15, the control device according to the fourth modified example may select the operation of the phase difference AF using the phase difference sensor having the region 133 as the detection range.

On the other hand, attention is paid to a case in which the set target region 150 is set to be positioned inside the region 131. In this case, it is possible to control the focus such that focus is on the subject positioned in the target region 150 by using the operation of the phase difference AF using the phase difference sensor having the region 131 as the detection range. Therefore, for example, the control device may select the operation of the phase difference AF using a phase difference sensor with a higher degree of accuracy that is, the phase difference sensor having the region 131 as the detection range) out of the phase difference sensor having the region 131 as the detection range and the phase difference sensor having the region 133 as the detection range.

Further, the case in which the operation of the phase difference AF is switched has been described above as an example, but the present disclosure is not necessarily limited to the example described above. As a specific example, it will be appreciated that the control device according to the fourth modified example may selectively switch the operations of the AE and the AWB, various kinds of recognition processes such as the face recognition, or the like on the basis of the setting result of the target region 150.

With this configuration, the control device according to the fourth modified example can image the subject positioned in the target region 150 in a more suitable form by using the setting result of the target region 150.

The example of an operation in the case in which the control device according to the present embodiment selectively switches the operation related to the image capturing by using the setting result of the target region 150 based on the display information such as the grid line has been described above as the fourth modified example.

2.5. Fifth Modified Example: UI Presentation Example

Next, as a fifth modified example, an example of a UI for assisting the user with the photography of the image in a more suitable form will be described as an example of a UI according to the present embodiment.

Figure 16:
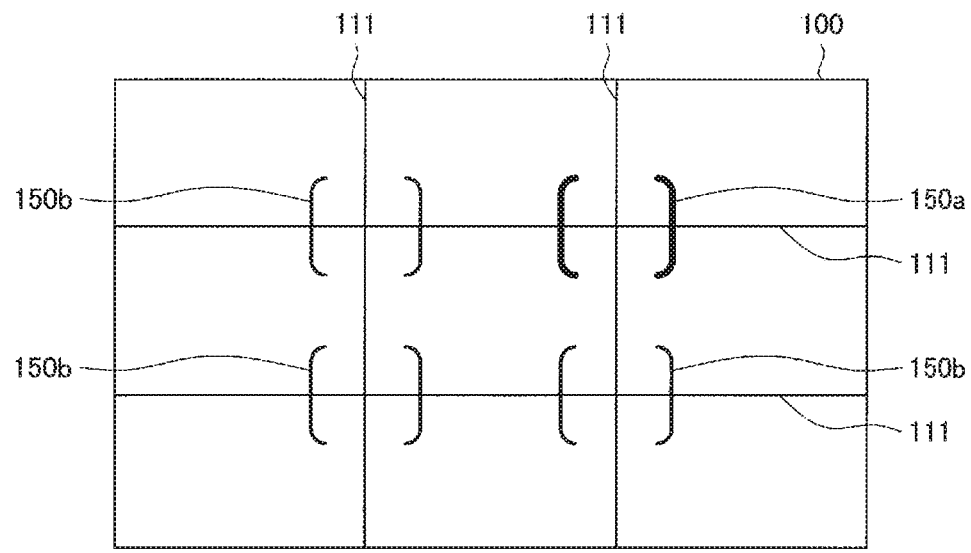
FIG. 16 is an explanatory diagram for describing an example of a UI presented by a control device according to a fifth modified example.

For example, FIG. 16 is an explanatory diagram for describing an example of the UI presented by the control device according to the fifth modified example. FIG. 16 illustrates a state in which the control device sets a plurality of target regions 150 on the basis of the grid lines 111 presented in the display region 100 in which the captured image is displayed and selects one target region 150 used for controlling the operation related to the image capturing from among a plurality of the target regions 150. Further, a target region indicated by reference numeral 150a indicates the target region 150 used for operation related to the image capturing (that is, the target region 150 selected by the control device). Further, a target region indicated by reference numeral 150b indicates a target region 150 which is not used for the operation related to the image capturing.

In other words, in the example illustrated in FIG. 16, the control device presents the target region 150a selected for use in controlling the operation related to the image capturing and the other target region 150b in different forms (for example, in different colors). With such control, the user can recognize the target region 150a used for the operation related to the image capturing by the imaging unit (for example, the AF, the AE, the AWB, or the like) among a plurality of target regions 150 set by the control device.

Further, as long as the selected target region 150a and the other target region 150b are presented in different forms, a method thereof is not particularly limited. As a specific example, the control device may present the target region 150a and the target region 150b in different colors. Further, as another example, the control device may cause only the selected target region 150a out of the target regions 150a and 150b to blink.

Figure 17:
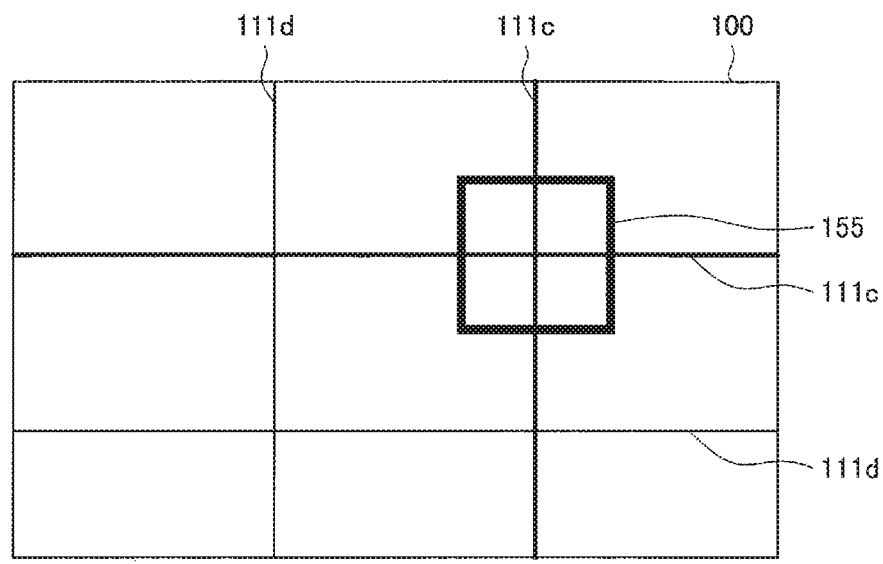
FIG. 17 is an explanatory diagram for describing another example of the UI presented by the control device according to the fifth modified example.

Further, FIG. 17 is an explanatory diagram for describing another example of the UI presented by the control device according to the fifth modified example. FIG. 17 illustrates a state in which one target region 150 among a plurality of target regions 150 set on the basis of the grid lines 111 presented in the display region 100 in which the captured image is displayed is selected as the target region 155 used for controlling the operation related to the image capturing by the imaging unit. Further, a grid line indicated by a reference numeral 111c is a grid line in which at least a part thereof is included in the target region 155, that is, the grid line used for setting the target region 155. Further, a grid line indicated by the reference numeral 111d indicates a grid line which is not used for setting the target region 155.

In other words, in the example illustrated in FIG. 17, the control device presents the grid line 111c used for setting the target region 155 used for controlling the operation related to the image capturing by the imaging unit among the grid lines 111 and the other grid lines 111d in different forms. With such control, the user can recognize the grid line 111 used for controlling the operation related to the image capturing by the imaging unit.

Further, it is similar to the example illustrated in FIG. 16 in that, as long as the grid line 111c and the other grid line 111d are presented in different forms, a method thereof is not particularly limited.

Figure 18:
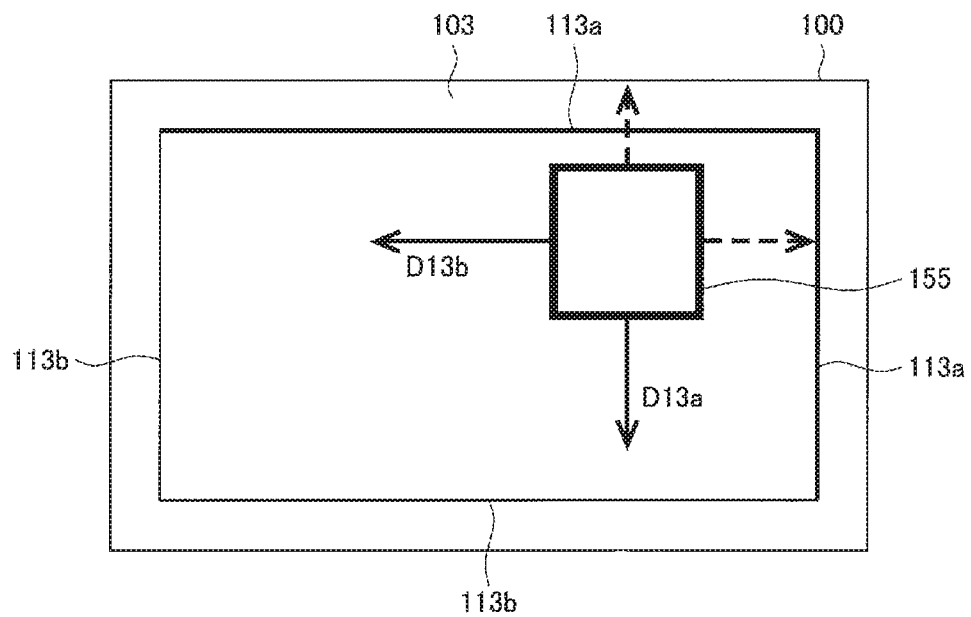
FIG. 18 is an explanatory diagram for describing another example of UI presented by the control device according to the fifth modified example.

Further, FIG. 18 is an explanatory diagram for describing another example of the UI presented by the control device according to the fifth modified example. FIG. 18 illustrates an example in which the region as the display target such as the safe region is identifiably presented in the display region 100 in which the captured image is displayed, similarly to the example described above with reference to FIG. 14. In other words, in the example illustrated in FIG. 18, the subject positioned in the target region 155 is highly likely to move in a direction D13a or D13b in which it is away from an auxiliary line 113a located near the target region 155 (that is, the subject is unlikely to move toward the auxiliary line 113a).

In this regard, in the example illustrated in FIG. 18, the control device presents the auxiliary line 113a and the other auxiliary line 113b in different forms, and thus a notification indicating that the auxiliary line 113a is used for estimating the moving directions D13a and D13b of the subject positioned in the target region 155 is given to the user.

Further, it is similar to the example illustrated in FIGS. 16 and 17 in that, as long as the auxiliary line 113a and the other auxiliary line 113b are presented in different forms, a method thereof is not particularly limited.

Figure 19:
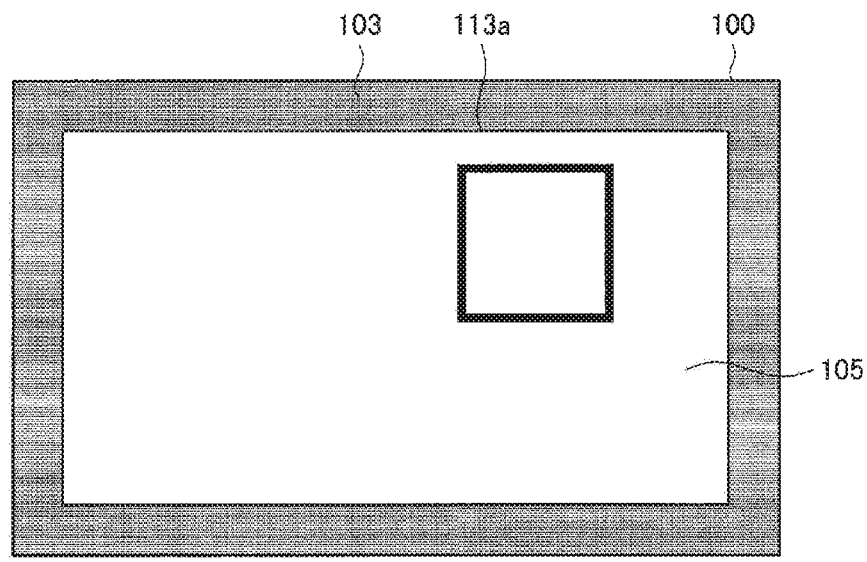
FIG. 19 is an explanatory diagram for describing another example of the UI presented by the control device according to the fifth modified example.

Further, FIG. 19 is an explanatory diagram for describing another example of the UI presented by the control device according to the fifth modified example. FIG. 19 illustrates an example in which the region as the display target such as the safe region is identifiably presented in the display region 100 in which the captured image is displayed, similarly to the example described above with reference to FIG. 9.

As described above, in a case in which the captured image is output to the external display device, the control device can set the region 103 in which the captured image is not displayed in the display region 100 as the excluded region. In this regard, in the example illustrated in FIG. 19, the control device presents the region 103 set as the excluded region in a form different from the form of the other region 105 (that is, the region serving as the display target). With such control, the user can recognize the excluded region (that is, the region in which the target region 150 is not set). Further, it is similar to the example illustrated in FIGS. 16 and 18 in that, as long as the region 103 set as the excluded region and the other region 105 are presented in different forms, a method thereof is not particularly limited.

The example of a UI for assisting the user with the photography of the image in a more suitable form has been described above as the example of the UI according to the present embodiment as the fifth modified example.

3. EXAMPLES

Next, an example of the control device according to the present embodiment will be described.

3.1. First Example: Example of Implementation of Automatic Control Function Based on Setting of Target Region First, as a first example, an example in which a function of setting the target region on the basis of facial expression information (for example, the grid line) presented together with the captured image described above and using the target region for controlling the operation (for example, the AF, the AE, the AWB, or the like) related to the image capturing by the imaging unit (in this description, also referred to as an "automatic control function according to the present embodiment") is implemented in an imaging device such as a so-called digital camera will be described.

As a specific example, the automatic control function according to the present embodiment may be implemented so that it can be selectively enabled or disabled as an independent function. For example, FIG. 20 is an explanatory diagram for describing an example of an implementation method of the automatic control function according to the first example, and illustrates an example of a manipulation menu in a case in which the automatic control function is implemented as an independent function.

Figure 20:
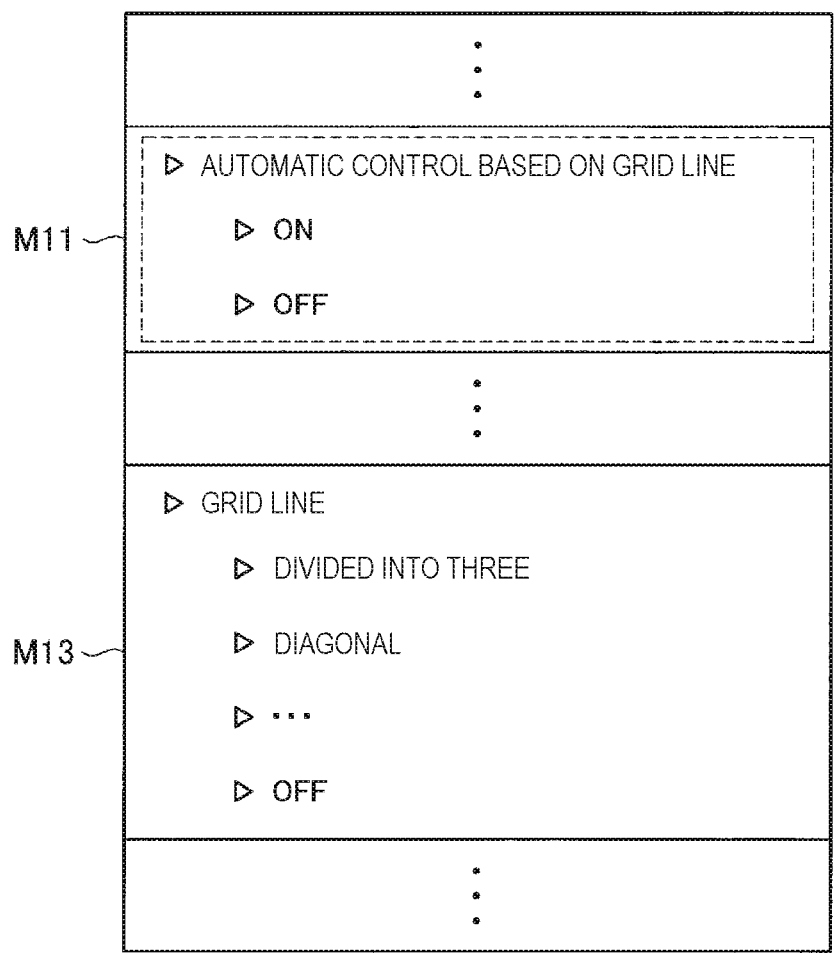
FIG. 20 is an explanatory diagram for describing an example of a method of implementing an automatic control function according to a first example.

In the example illustrated in FIG. 20, a manipulation menu M11 for turning on or off (enabling or disabling) the function of "automatic control based on the grid line" is provided as the manipulation menu for manipulating the imaging device. In this case, in a case in which the manipulation menu M11 is set to "ON" on the basis of the manipulation from the user, the control device (for example, the imaging device) according to the present example enables the function of the automatic control based on the grid line (that is, the automatic control function according to the present embodiment).

Further, a type of a grid line to be presented may be set on the basis of the existing manipulation menu. For example, in the example illustrated in FIG. 20, a manipulation menu M13 for setting the type of grid line is separately provided as the manipulation menu M11. In this case, in a case in which the manipulation menu M11 is set to "ON," the control device according to the present example may set the target region on the basis of the type of grid line set in the manipulation menu M13.

Further, the manipulation menu M13 may be configured to be able to set the display of the grid line to OFF (that is, to be able to perform a setting of causing the grid line not to be displayed). In this case, in a case in which the display of the grid line by the manipulation menu M13 is set to "OFF," the control device according to the present example may be restricted so that the manipulation menu M11 is unable to be set to "ON." Further, as another example, in a case in which the display of the grid line is set to "OFF" by the manipulation menu M13 even when the manipulation menu M11 is set to "ON," the control device according to the present example may substantially disable the function of the automatic control according to the present embodiment.

Further, as another example, the automatic control function according to the present embodiment may be implemented as one of operation modes provided by the existing function. For example, FIG. 21 is an explanatory diagram for describing another example of the implementation method of the automatic control function according to the first example, and illustrates an example of the manipulation menu in a case in which the automatic control function is implemented as one of operation modes provided by the existing function.

Figure 21:
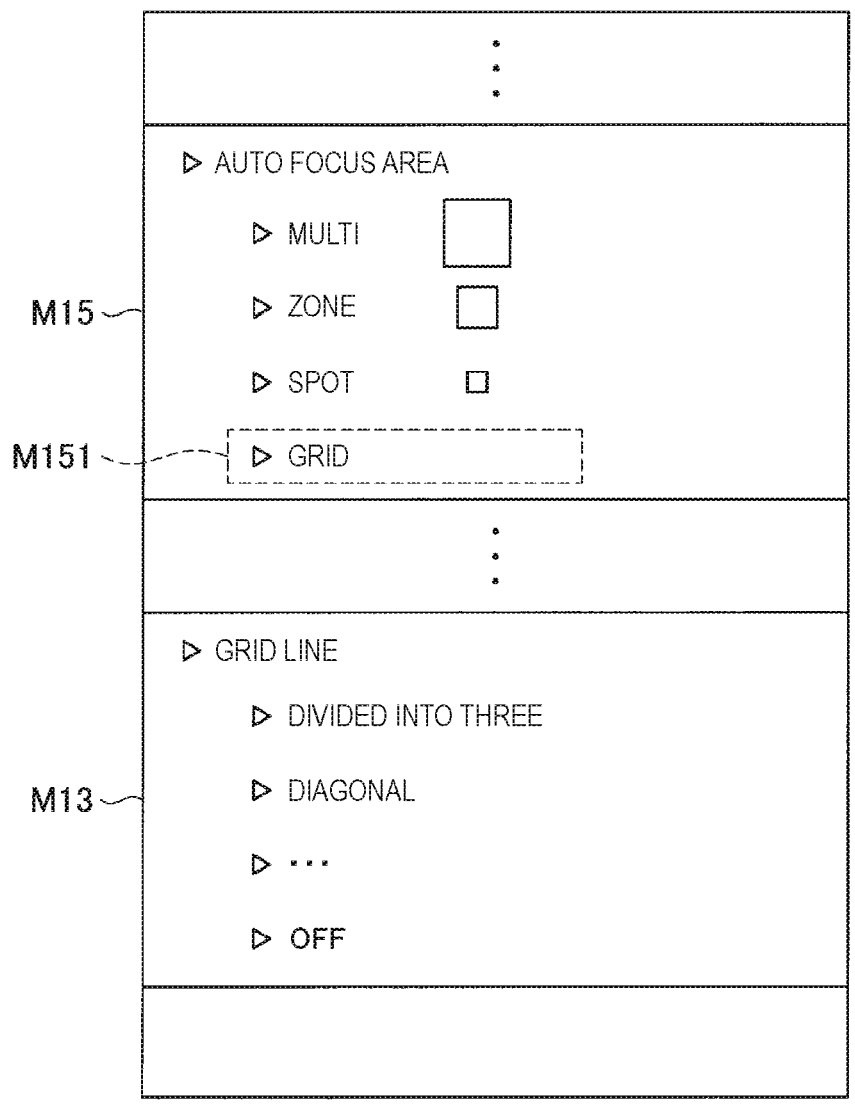
FIG. 21 is an explanatory diagram for describing another example of a method of implementing an automatic control function according to the first example.

The example illustrated in FIG. 21 is an example in which an item M151 of an operation mode for automatically controlling the AF on the basis of the grid line is added to a manipulation menu M15 for setting an "auto focus area" as a setting of the operation related to the AF. In this case, in a case in which the item M151 is selected in the manipulation menu M15, the control device according to the present example enables the function of automatically controlling the AF on the basis of the grid line (that is, the automatic control function according to the present embodiment).

Further, the type of grid line to be presented may be set on the basis of the manipulation menu M13, similarly to the example illustrated in FIG. 20. In this case, in a case in which the function of automatically controlling the AF is enabled on the basis of the grid line, the control device according to the present example preferably selects the item M151 in the manipulation menu M15 and thus sets the target region on the basis of the type of grid line set in the manipulation menu M13.

Further, in the example illustrated in FIG. 21, similarly to the example illustrated in FIG. 20, in a case in which the display of the grid line by the manipulation menu M13 is set to "OFF," the control device according to the present example may be restricted so that the item M151 in the manipulation menu M15 is unable to be selected. Further, as another example, in a case in which the display of the grid line is set to "OFF" by the manipulation menu M13 even when the item M151 is selected in the manipulation menu M 15, the control device according to the present example may substantially disable the function of automatically controlling the AF on the basis of the grid line.

Further, the imaging device may be configured such that the manipulation on each manipulation menu described above with reference to FIGS. 20 and 21 is allocated to, for example, some buttons (for example, function buttons) installed in the imaging device.

The example in which the function of setting the target region on the basis of the facial expression information presented together with the captured image and using the target region for controlling the operation related to the image capturing by the imaging unit is implemented in the imaging device such as a so-called digital camera has been described as the first example.

3.2. Second Example: Application Example

Next, an application example of the control device according to the present embodiment will be described as a second example. The above embodiment and the respective modified examples have been described focusing on the case in which the control device according to the present embodiment is applied to the imaging device such as a so-called digital camera. On the other hand, as long as it is possible to set at least one target region on the basis of the display information presented together with a captured image such as the grid line and use at least one of the set target regions for controlling various kinds of operations, the application destination of the control device according to the present embodiment is not necessarily limited to the imaging device.

As a specific example, the control device according to the present embodiment may be applied to devices used in the medical field such as endoscopes or surgical microscopes.

Further, as another example, the control device according to the present embodiment may be applied to in-vehicle devices installed in vehicles such as automobiles such as so-called navigation devices.

Further, the manipulation I/F for manipulating the UI provided by the control device according to the present embodiment may be changed in accordance with the use form of various kinds of devices to which the control device of the present embodiment is applied.

As a specific example, a manipulation I/F in which a detection result of the line of sight direction of the user based on an eye tracking technique or the like is used as a user input (a so-called manipulation I/F based on an input of a line of sight) may be applied as the manipulation I/F for manipulating the UI provided by the control device according to the present embodiment. As a more specific example, for devices which can be used during surgery such as endoscopes or surgical microscopes, there are cases in which the manipulation I/F based on the input of the line of sight described above is applied instead of the manipulation I/F of the touch panel in order to avoid a situation in which the hand of the user (for example, a surgeon) gets dirty due to a manipulation on a device. On the other hand, for example, under a situation in which the position designated by the user is detected in the captured image presented to the user, the manipulation I/F based on the input of the line of sight may be lower in detection accuracy thereof than a case in which the designation is performed through the manipulation I/F such as the touch panel.

On the other hand, in the UI provided by the control device according to the present embodiment, as described above, since at least one target region is set on the basis of the display information such as the grid line and presented to the user, it is preferable for the user to select a desired target region from the presented target regions. In other words, in the UI provided by the control device according to the present embodiment, it is not necessary to designate the position in the presented captured image in detail. Therefore, even wider a situation in which the manipulation OF which is relatively low in the detection accuracy of the position designated by the user such as the manipulation I/F based on the input of the line of sight is applied, the control device according to the present embodiment can execute control closer to the user's intention.

Further, the control device according to the present embodiment may control the operation of each imaging unit in a system in which a plurality of imaging units (imaging devices) operate in cooperation with one another. In this case, for example, the control device may use the setting result of the target region 150 based on the display information (for example, the grid line or the like) superimposed and displayed on the captured image captured by some imaging units among a plurality of imaging units for the control of the operation related to the image capturing by the other imaging units.

Further, the application example of the control device according to the present embodiment described above is merely an example, in other words, as long as it is possible to set at least one target region on the basis of the display information presented together with the captured image and use at least one set target region for controlling various kinds of operations, the application destination of the control device according to the present embodiment is not particularly limited.

The application example of the control device according to the present embodiment has been described above as the second example.

4. CONCLUSION

As described above, the control device according to the present embodiment sets at least one target region in accordance with the display information displayed together with the captured image such as the grid line. Further, the control device uses at least some target regions among at least one set target regions for controlling the operation related to the image capturing by the imaging unit. With such control, the control device according to the present embodiment can control the operation related to the image capturing by the imaging unit such that the subject close to the user's intention among the subjects imaged by the imaging unit is preferentially imaged.

Further, the control device according to the present embodiment can exclude regions other than the set target region from the target of the region used for controlling the operation related to the image capturing by the imaging unit. Therefore, for example, it is possible to further reduce the probability of the occurrence of a situation in which an image of a subject unintended by the user is preferentially captured.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control device including:

a setting unit configured to set a region corresponding to at least a part of an image captured by an imaging unit in accordance with display information for assisting with photography, the display information being displayed together with the image; and a control unit configured to control an operation related to imaging by the imaging unit on a basis of the at least one region.

(2)

The control device according to (1), in which the display information is information for dividing the captured image into a plurality of partial regions, and the setting unit sets the region in accordance with a form in which the image is divided into the partial regions in accordance with the display information.

(3)

The control device according to (2), in which the region is set to include an intersection point of boundaries of the plurality of partial regions.

(4)

The control device according to (3), in which the setting unit controls an area of the region in accordance with the form in which the image is divided into the plurality of partial regions.

(5)

The control device according to (2), in which the display information is information for dividing the image captured by the imaging unit into the partial regions serving as a display target for an external display device and other partial regions on a basis of a display setting for displaying the image on the display device, and the setting unit sets the at least one region from the partial regions serving as the display target.

(6)

The control device according to (1), in which the display information is display information for identifiably presenting a state related to image capturing by the imaging unit, and the setting unit sets the at least one region among other regions different from a region occupied by the display information in the image.

(7)

The control device according to any one of (1) to (6), in which the control unit controls a display form of at least part of the display information in accordance with the region used for controlling the operation among the plurality of set regions.

(8)

The control device according to (7), in which the display information is information for dividing the image into a plurality of partial regions, and the control unit performs control such that a boundary at least a part of which is included in the region used for controlling the operation among the plurality of boundaries of dividing the image into the plurality of partial regions is presented in a form different from forms of the other boundaries.

(9)

The control device according to any one of (1) to (8), in which the operation is a focusing operation, and the control unit performs control such that focus is on a subject corresponding to the at least one set region.

(10)

The control device according to any one of (1) to (9), in which the control unit selects at least some operations among a plurality of operations having different forms as the operation in accordance with the set region.

The control device according to (10), in which the control unit selects at least some operations among a plurality of operations which differ in a region of the image used for control as the operation in accordance with the set region.

(12)

The control device according to any one of (1) to (11), in which the control unit controls the operation on a basis of each of two or more of the plurality of set regions.

(13)

The control device according to any one of (1) to (12), in which the control unit controls each of a plurality of operations having different forms individually as the operation on a basis of at least some regions among the at least one set region.

(14)

The control device according to any one of (1) to (13), in which the control unit selectively presents each of the set at least one region and controls the operation on a basis of the selected region.

(15)

The control device according to any one of (1) to (14), in which the control unit decides the region used for controlling the operation among the at least one set region in accordance with a state of the imaging unit.

(16)

The control device according to (1), in which the display information is information superimposed and displayed on the image.

(17)

A control method including, by a processor:

setting a region corresponding to at least a part of an image captured by an imaging unit in accordance with display information for assisting with photography, the display information being displayed together with the image; and controlling an operation related to imaging by the imaging unit on a basis of the at least one region.

(18)

A program causing a computer to execute:

setting a region corresponding to at least a part of an image captured by an imaging unit in accordance with display information for assisting with photography, the display information being displayed together with the image; and controlling an operation related to imaging by the imaging unit on a basis of the at least one region.

REFERENCE SIGNS LIST 11 lens barrel
11A imaging optical system
12 optical filter
13 image sensor
14 main processing unit
15 lighting control unit
16 sensor drive unit
17 processing unit
18 image processing unit
19 focus drive unit
20 display unit
21 manipulating unit
22 flash memory
23 focus actuator
24 lighting unit
31 CPU
32 memory
33 ADC
34 DAC
35 communication I/F

The invention claimed is:

1. A control device comprising:
a setting unit configured to set a region corresponding to at least a part of an image captured by an imaging unit in accordance with display information for assisting with photography, the display information being displayed together with the image; and
a control unit configured to control an operation related to imaging by the imaging unit on a basis of the at least one region,
wherein the display information is display information for identifiably presenting a state related to image capturing by the imaging unit, and the setting unit sets the at least one region among other regions different from a region occupied by the display information in the image.

2. The control device according to claim 1, wherein the display information is information for dividing the captured image into a plurality of partial regions, and the setting unit sets the region in accordance with a form in which the image is divided into the partial regions in accordance with the display information.

3. The control device according to claim 2, wherein the region is set to include an intersection point of boundaries of the plurality of partial regions.

4. The control device according to claim 3, wherein the setting unit controls an area of the region in accordance with the form in which the image is divided into the plurality of partial regions.

5. The control device according to claim 2, wherein the display information is information for dividing the image captured by the imaging unit into the partial regions serving as a display target for an external display device and other partial regions on a basis of a display setting for displaying the image on the display device, and the setting unit sets the at least one region from the partial regions serving as the display target.

6. The control device according to claim 1, wherein the control unit controls a display form of at least part of the display information in accordance with the region used for controlling the operation among the plurality of set regions.

7. The control device according to claim 6, wherein the display information is information for dividing the image into a plurality of partial regions, and the control unit performs control such that a boundary at least a part of which is included in the region used for controlling the operation among the plurality of boundaries of dividing the image into the plurality of partial regions is presented in a form different from forms of the other boundaries.

8. The control device according to claim 1, wherein the operation is a focusing operation, and the control unit performs control such that focus is on a subject corresponding to the at least one set region.

9. The control device according to claim 1, wherein the control unit selects at least some operations among a plurality of operations having different forms as the operation in accordance with the set region.

10. The control device according to claim 9, wherein the control unit selects at least some operations among a plurality of operations which differ in a region of the image used for control as the operation in accordance with the set region.

11. The control device according to claim 1, wherein the control unit controls the operation on a basis of each of two or more of the plurality of set regions.

12. The control device according to claim 1, wherein the control unit controls each of a plurality of operations having different forms individually as the operation on a basis of at least some regions among the at least one set region.

13. The control device according to claim 1, wherein the control unit selectively presents each of the set at least one region and controls the operation on a basis of the selected region.

14. The control device according to claim 1, wherein the control unit decides the region used for controlling the operation among the at least one set region in accordance with a state of the imaging unit.

15. The control device according to claim 1, wherein the display information is information superimposed and displayed on the image.

16. A control method comprising, by a processor:
setting a region corresponding to at least a part of an image captured by an imaging unit in accordance with display information for assisting with photography, the display information being displayed together with the image; and
controlling an operation related to imaging by the imaging unit on a basis of the at least one region,
wherein the display information is display information for identifiably presenting a state related to image capturing by the imaging unit, and the setting unit sets the at least one region among other regions different from a region occupied by the display information in the image.

17. A non-tranisitory computer-readable media comprising a program causing a computer to execute: setting a region corresponding to at least a part of an image captured by an imaging unit in accordance with display information for assisting with photography, the display information being displayed together with the image; and controlling an operation related to imaging by the imaging unit on a basis of the at least one region, wherein the display information is display information for identifiably presenting a state related to image capturing by the imaging unit, and the setting unit sets the at least one region among other regions different from a region occupied by the display information in the image.

* * * * *